United States Patent
Kim et al.

(10) Patent No.: US 10,447,505 B2
(45) Date of Patent: Oct. 15, 2019

(54) METHOD FOR PERFORMING SELF-INTERFERENCE CANCELLATION IN FDR ENVIRONMENT AND DEVICE FOR SAME

(71) Applicant: LG ELECTRONICS INC., Seoul (KR)

(72) Inventors: Dongkyu Kim, Seoul (KR); Hyunsoo Ko, Seoul (KR); Kukheon Choi, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/577,656

(22) PCT Filed: May 26, 2016

(86) PCT No.: PCT/KR2016/005553
§ 371 (c)(1),
(2) Date: Nov. 28, 2017

(87) PCT Pub. No.: WO2016/195315
PCT Pub. Date: Dec. 8, 2016

(65) Prior Publication Data
US 2018/0167239 A1 Jun. 14, 2018

Related U.S. Application Data

(60) Provisional application No. 62/167,901, filed on May 29, 2015.

(51) Int. Cl.
*H04L 25/03* (2006.01)
*H04L 1/00* (2006.01)
(Continued)

(52) U.S. Cl.
CPC .......... *H04L 25/03* (2013.01); *H04B 7/0413* (2013.01); *H04L 1/00* (2013.01); *H04L 1/20* (2013.01);
(Continued)

(58) Field of Classification Search
CPC .......... H04L 5/1461; H04B 1/52; H04B 15/00
(Continued)

(56) References Cited

U.S. PATENT DOCUMENTS

2014/0099908 A1 4/2014 Bornazyan
2015/0009868 A1 1/2015 Jana et al.
(Continued)

FOREIGN PATENT DOCUMENTS

WO WO 2014/190088 A1 11/2014

*Primary Examiner* — Kevin Kim
(74) *Attorney, Agent, or Firm* — Birch, Stewart, Kolasch & Birch, LLP

(57) ABSTRACT

A method for performing self-interference cancellation by a device using an FDR mode comprises a step for performing nonlinear digital self-interference cancellation on the basis of a condition defined for the nonlinear digital self-interference cancellation, wherein the defined condition can comprise information about the order of a self-interference component to be considered for the nonlinear digital self-interference cancellation in correspondence with transmission power of the device.

10 Claims, 6 Drawing Sheets

(51) Int. Cl.
*H04L 5/00* (2006.01)
*H04L 25/02* (2006.01)
*H04B 7/0413* (2017.01)
*H04L 1/20* (2006.01)
*H04L 5/14* (2006.01)

(52) U.S. Cl.
CPC ............... *H04L 5/00* (2013.01); *H04L 5/14* (2013.01); *H04L 25/02* (2013.01); *H04L 25/0224* (2013.01)

(58) Field of Classification Search
USPC .......................................... 375/348; 370/278
See application file for complete search history.

(56) References Cited

U.S. PATENT DOCUMENTS

| | | | |
|---|---|---|---|
| 2015/0043323 A1 | 2/2015 | Choi et al. | |
| 2015/0063176 A1* | 3/2015 | Hong | H04B 7/15585 370/279 |
| 2015/0065058 A1 | 3/2015 | Wang et al. | |

\* cited by examiner

METHOD FOR PERFORMING SELF-INTERFERENCE CANCELLATION IN FDR ENVIRONMENT AND DEVICE FOR SAME

CROSS REFERENCE TO RELATED APPLICATIONS:

This application is the National Phase of PCT International Application No. PCT/KR2016/005553, filed on May 26, 2016, which claims priority under 35 U.S.C. 119(e) to U.S. Provisional Application No. 62/167,901, filed on May 29, 2015, all of which are hereby expressly incorporated by reference into the present application.

TECHNICAL FIELD

The present invention relates to wireless communication, and more particularly, to a method for performing self-interference cancellation in an FDR environment and a device for the same.

BACKGROUND ART

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FDR system to significantly deteriorate performance of the FDR system. Therefore, first of all, intra-device SI needs to be cancelled in order to operate the FDR system.

DISCLOSURE

Technical Problem

An object of the present invention devised to solve the problem lies in a method for performing self-interference cancellation by a device using the FDR scheme.

Another object of the present invention is to provide a device for performing self-interference cancellation in an FDR environment.

The technical objects that can be achieved through the embodiments are not limited to what has been particularly described hereinabove and other technical objects not described herein will be more clearly understood by those skilled in the art from the following detailed description.

Technical Solution

The object of the present invention can be achieved by providing a method for performing cancellation of self-interference by an apparatus which uses a full duplex radio (FDR) scheme, the method including performing cancellation of nonlinear digital self-interference based on a condition defined for cancellation of the non-linear digital self-interference, wherein the defined condition may include information on an order of a self-interference component to be considered for cancellation of the nonlinear digital self-interference in correspondence with a transmit power of the apparatus. When the transmit power is less than a first transmit power value, cancellation of digital self-interference may be performed considering only a linear digital self-interference component. When the transmit power is greater than or equal to the first transmit power value and less than a second transmit power value, the cancellation of nonlinear digital self-interference may be performed considering digital self-interference components up to a third-order nonlinear digital self-interference component. When the transmit power is greater than or equal to the second transmit power value and less than a third transmit power value, the cancellation of nonlinear digital self-interference may be performed considering digital self-interference components up to a fifth-order nonlinear digital self-interference component. The defined condition may be variable according to performance of antenna self-interference cancellation or performance of analog self-interference cancellation in the apparatus. The defined condition may include information on an order of a self-interference component to be considered in mapping of reference signal for self-interference channel estimation corresponding to the transmit power of the apparatus. The order of the self-interference component to be considered for the cancellation of nonlinear digital self-interference may be the same as or different from the order of the self-interference component to be considered in the mapping of reference signal for the self-interference channel estimation. The apparatus may include a user equipment or a base station.

In another aspect of the present invention, provided herein is an apparatus for performing cancellation of self-interference in an a full duplex radio (FDR) environment, the apparatus including a processor configured to perform cancellation of nonlinear digital self-interference based on a condition defined for the cancellation of non-linear digital self-interference, wherein the defined condition may include information on an order of a self-interference component to be considered for the cancellation of nonlinear digital self-interference in correspondence with a transmit power of the apparatus. When the transmit power is less than a first transmit power value, the processor may be configured to perform cancellation of digital self-interference considering only a linear digital self-interference component. When the transmit power is greater than or equal to the first transmit power value and less than a second transmit power value, the processor may be configured to perform the cancellation of nonlinear digital self-interference considering digital self-interference components up to a third-order nonlinear digital self-interference component. When the transmit power is greater than or equal to the second transmit power value and less than a third transmit power value, the processor may be configured to perform the cancellation of nonlinear digital self-interference considering digital self-interference components up to a fifth-order nonlinear digital self-interference component. The defined condition may be variable according to performance of antenna self-interference cancellation or performance of analog self-interference cancellation in the apparatus. The defined condition may include information on an order of a self-interference component to be considered in reference signal mapping for self-interference channel estimation in correspondence with the transmit power of the apparatus.

Advantageous Effects

According to an embodiment of the present invention, by adaptively applying an order for mapping of RS for self-interference channel estimation and an order for cancellation of nonlinear digital self-interference to variations in the transmit power of the apparatus, communication performance may be improved.

It will be appreciated by those skilled in the art that the effects that can be achieved through the embodiments of the present disclosure are not limited to those described above and other effects of the present disclosure will be more clearly understood from the following detailed description.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Figure 1:
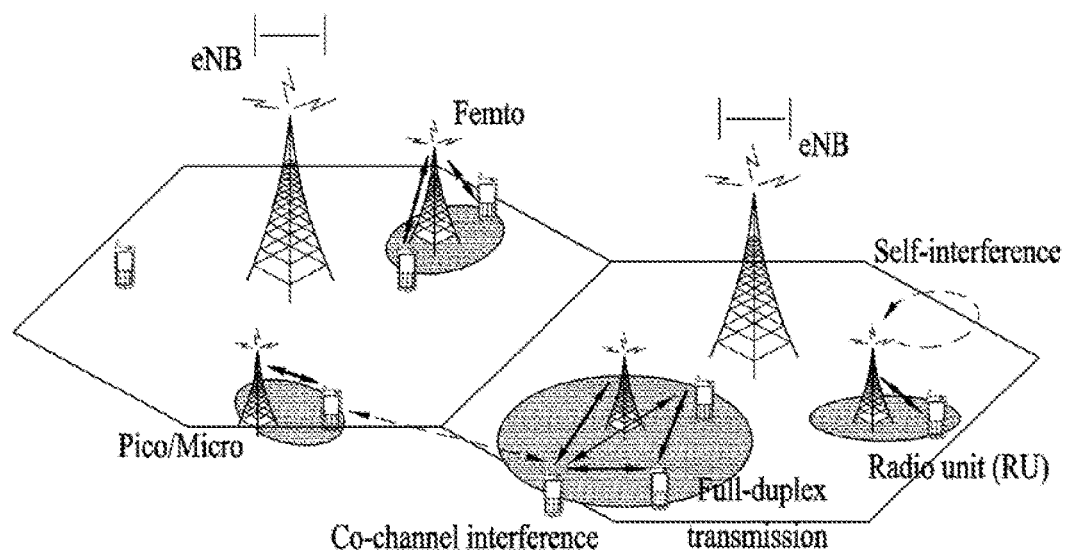
FIG. 1 is a view exemplarily illustrating a network supporting a full/half duplex communication operation mode of a UE according to the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
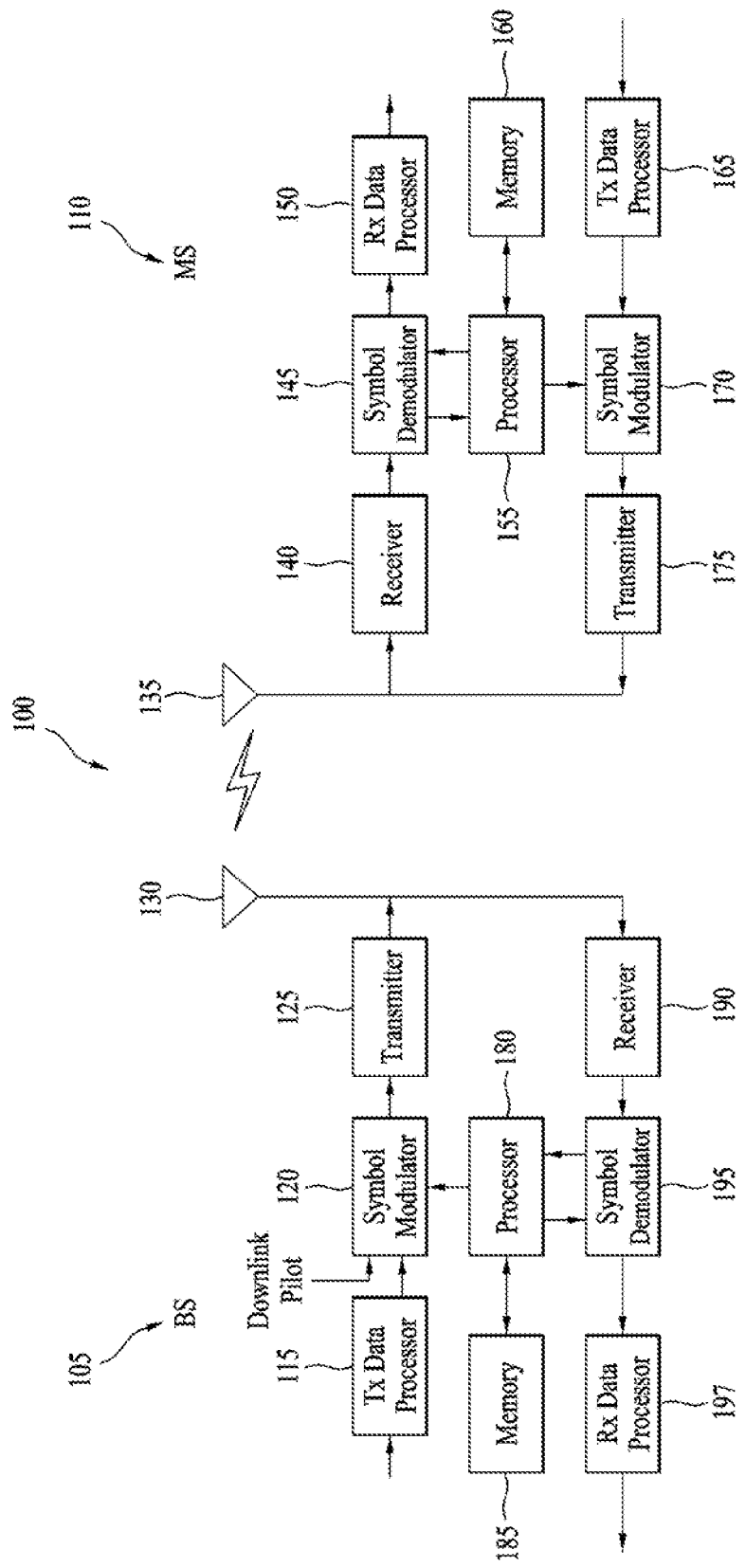
FIG. 2 is a block diagram for configurations of a base station 105 and a user equipment 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
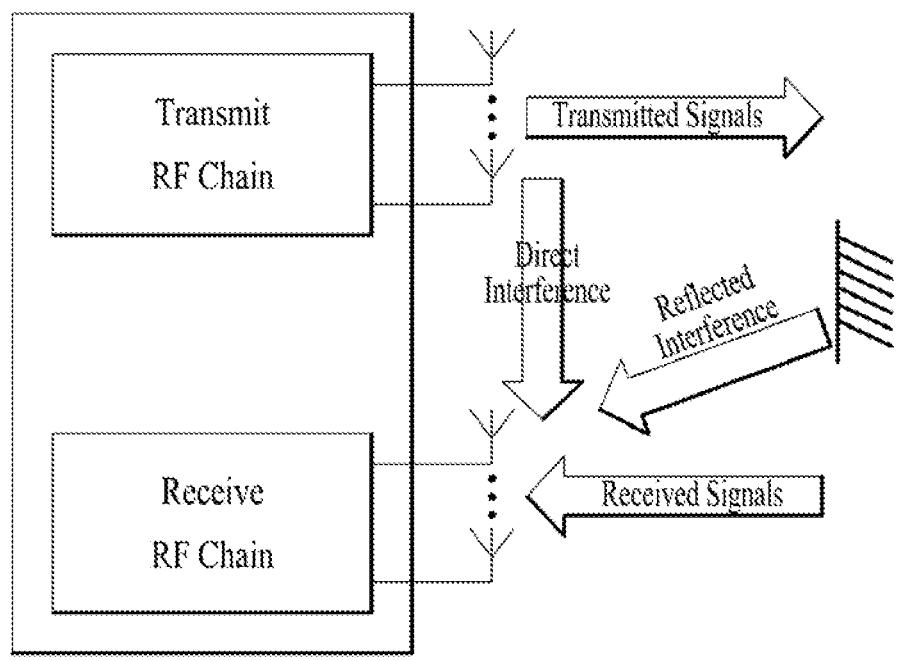
FIG. 3 is a diagram showing the concept of a transmission/reception link and self-interference (SI) in an FDR communication situation.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of apparatuses (in the case where FDR is applied to a mobile communication system (BW=20 MHz)) may be determined as illustrated in Table 1 below.

TABLE 1

| Node Type | Max. Tx Power ($P_A$) | Thermal Noise. (BW = 20 MHz) | Receiver NF | Receiver Thermal Noise Level | Self-IC Target ($P_A$- TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm Self-IC performance. A thermal noise value may be changed to $N_{C,BW}$=−174 dBM+10×$\log_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
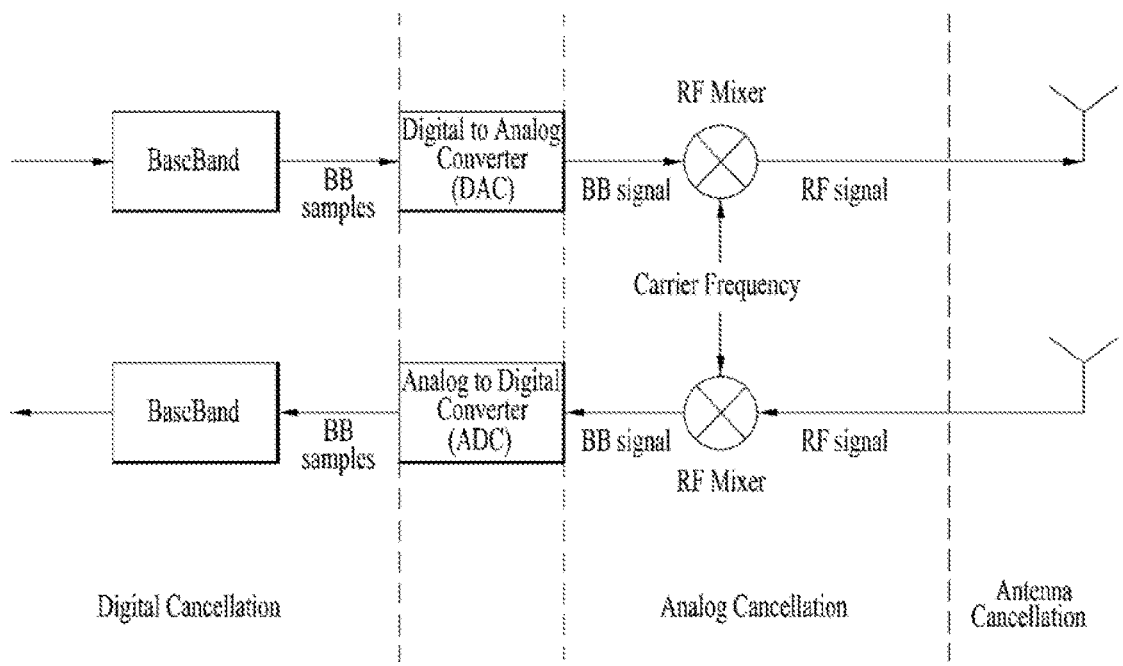
FIG. 4 is a view illustrating positions at which three Self-IC schemes are applied, in a Radio Frequency (RF) Tx and Rx end (or an RF front end) of a device.

FIG. 4 is a view illustrating positions at which three Self-IC schemes are applied, in a Radio Frequency (RF) Tx and Rx end (or an RF front end) of an apparatus (or device). Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
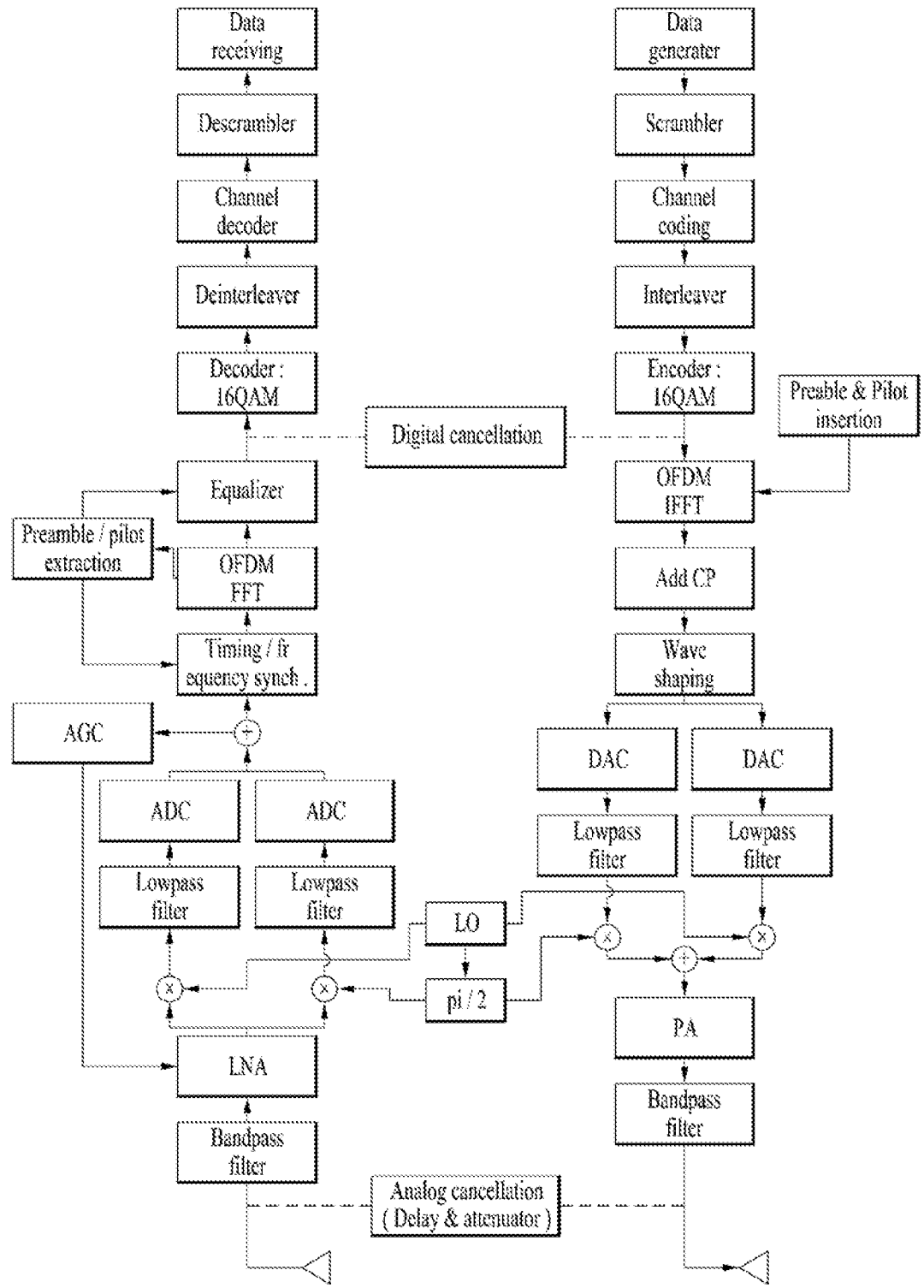
FIG. 5 is a block diagram of a Self-IC device in a proposed communication apparatus in an OFDM communication environment based on FIG. 4.

FIG. 5 is a block diagram of a Self-IC apparatus in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling of FDR System

Since the FDR system uses the same frequency for the Tx signal and the Rx signal, non-linear components of the RF are greatly affected. In particular, Tx signals are distorted due to nonlinear characteristics of active apparatuses such as the power amplifier (PA) and the low noise amplifier (LNA). Due to such distortions, modeling of the Tx signal may include high-order components. Thereamong, even-order components, which affect DC periphery, can be effectively removed using the conventional AC coupling or filtering technique. However, the odd-order components, which appear in the vicinity of an existing frequency, are not easily removed compared to the even-order components, and have a great influence upon reception. Considering these nonlinear characteristics of the odd-order components, the Rx signal after the ADC in the FDR system may be represented by Equation 1 below, using the parallel Hammerstein (PH) model.

$$y(n) = \quad \text{[Equation 1]}$$
$$h_D(n) * x_D(n) + \sum_{\substack{k=1,\ldots,K \\ k=\text{odd}}} h_{SI,k}(n) * |x_{SI}(n)|^{k-1} x_{SI}(n) + z(n)$$

Here, k is an odd number, $x_{SI}[n]$ is data transmitted by the RF Tx end of the apparatus, and $h_{SI}[n]$ is the gain of an SI channel experienced by the data transmitted by the RF Tx end. $x_D[n]$ is the data to be received at the RF Rx end of the apparatus, $h_D[n]$ is the gain of a desired channel experienced by the data to be received at the RF Rx end, and z[n] is additive white Gaussian noise (AWGN). If k=1, this indicates a linear component. If the value of k is an odd number greater than or equal to 3, this indicates a non-linear component.

In the FDR system, the power of self-interference increases as transmit power increases. Therefore, if the performance of the antenna self-IC and the analog self-IC is fixed, more self-IC components should be removed in digital self-IC in order to achieve desired target self-IC performance when the Tx power increases.

When the transmit power of the apparatus driven in the FDR scheme increases, the power of nonlinear SI components generated according to the characteristics of the FDR apparatus increases with a higher rate of increase than the linear SI components. The correlation between change in Tx power and the power of the linear SI component and the power of the nonlinear SI component may be expressed as shown in FIG. 6.

Figure 6:
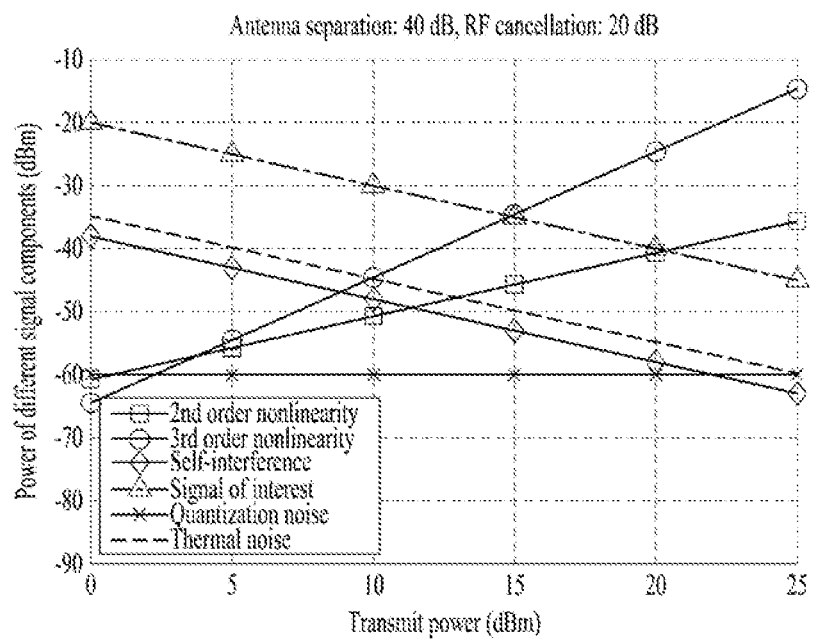
FIG. 6 is a diagram showing a difference in power between respective SI components in the FDR system according to change of transmit power.

FIG. 6 is a diagram showing a difference in power between respective SI components in the FDR system according to change of transmit power.

As shown in FIG. 6, when the transmit power is low (10 dBm or less), the power of the second-order nonlinear SI component (square marker) and the power of the third-order nonlinear SI component (circle marker) are below the thermal noise (dotted line), and therefore the desired self-IC performance may be obtained by digital self-interference cancellation alone considering only the linear SI components.

However, as the transmit power increases (beyond 10 dBm), the power of the second-order nonlinear SI component and the power of the third-order nonlinear SI component increase significantly over the thermal noise. Further, since the power of the nonlinear SI component increases over the power of the desired signal, the desired self-IC performance may not be obtained with digital self-interference cancellation considering only the linear SI component.

Moreover, it is evident that the SINR at the time of reception will be significantly lowered due to self-interference of high-order components which have not been removed. Therefore, when the transmit power increases, the powers of the linear and nonlinear SI components also increase, and accordingly nonlinear digital self-interference cancellation should be designed considering even the nonlinear SI components, that have not been considered previously, in order to stably operate the FDR system.

As described above, in designing nonlinear digital self-interference cancellation, variation of the powers of nonlinear SI components according to change in transmit power needs to be accurately estimated, and a precise criterion for determining the maximum order of nonlinear SI components to be estimated should be established.

Figure 7:
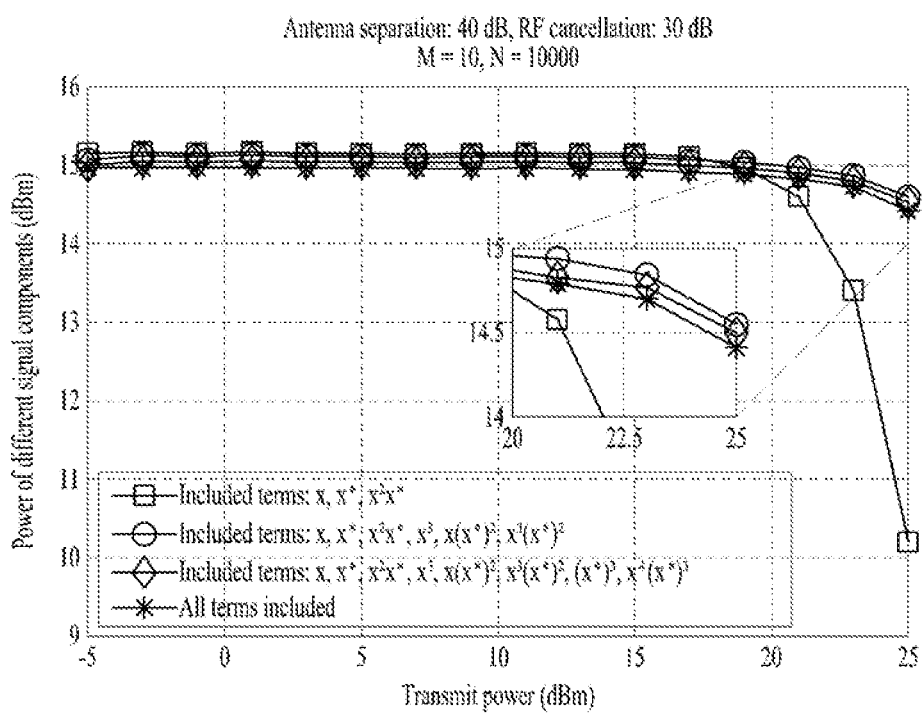
FIG. 7 is a diagram showing a reception SINR after nonlinear digital SI according to change in transmit power, considering various higher order nonlinear SI components.

FIG. 7 is a diagram showing a reception SINR after nonlinear digital SI according to change in transmit power, considering various higher order nonlinear SI components.

As can be seen from FIG. 7, in the case where the performance of antenna self-interference cancellation and the performance of RF self-interference cancellation are fixed to 40 dB and 30 dB (70 dB in total), when the transmit power is low (20 dBm or less), the performance of nonlinear digital self-interference cancellation considering third-order nonlinear self-interference is similar to that of nonlinear digital self-interference cancellation considering higher-order nonlinear self-interference. However, when the transmit power is greater than 20 dBm, it can be seen the performance of nonlinear digital self-interference cancellation considering higher-order (the fifth order, seventh order, all terms) nonlinear self-interference is relatively better than the performance of nonlinear digital self-interference cancellation considering only third or lower order nonlinear self-interference. This is because the power of higher-order nonlinear SI components increases as the transmit power increases.

Further, it can be seen that, when the transmit power is 15 dBm or less, the performance of nonlinear digital self-interference cancellation considering only low orders is better than that of the nonlinear digital self-interference cancellation techniques considering higher orders. In particular, it can be seen that, even when the transmit power is increased to a value between 15 dBm and 25 dBm, the performance of nonlinear digital self-interference cancellation considering up to the fifth order is better than that of a nonlinear digital self-interference cancellation technique considering up to the seventh order or all orders.

As described above, nonlinear digital self-IC requires estimation of a non-linear self-interference of an appropriate order according to the transmit power.

FIG. 7 shows results obtained when the performances of antenna self-IC and RF self-IC are fixed to 40 dB and 30 dB, respectively, and high self-IC performance of 70 dB is obtained even before ADC. If the performances of antenna self-IC and RF self-IC are degraded, the power of the nonlinear SI component as well as the power of the linear SI component will significantly increase after the ADC as disclosed above, which results in increased load of nonlinear digital self-IC. Therefore, it is necessary to estimate nonlinear self-interference of an appropriate order according to change in performance after antenna self-IC and RF self-IC as well as change in transmit power.

Embodiment 1: Pre-Listing Orders of Nonlinear Self-Interference that should be Considered According to Change in Transmit Power of an Apparatus (Base Station or User Equipment) Operating in the FDR Scheme in a Table to Perform Digital Self-IC As described above, the order of nonlinear digital self-IC to be performed may change according to change in transmit power of the apparatus. Conventional techniques perform nonlinear digital self-IC of a fixed order according to linear digital self-IC or the maximum transmit power of the apparatus without considering change transmit power. In this case, performance of nonlinear digital self-IC is degraded as mentioned above. Therefore, the order of nonlinear digital self-IC that should be considered in canceling self-interference according to change in the transmit power of the apparatus (base station or user equipment) operating in the FDR scheme may be preset in a table according to change in transmit power. As an example, the order of nonlinear digital self-IC according to change in transmit power in the user equipment operating in the FDR scheme may be implicitly set as shown in Table 2 below.

TABLE 2

| UE transmit power ($P_t$) | RS mapping for SI channel estimation | Order of nonlinear digital self-IC |
|---|---|---|
| $P_t < 10$ dBm | Linear Only | Linear Only |
| 10 dBm ≤ $P_t < 15$ dBm | Linear + $3^{rd}$ order | Linear + $3^{rd}$ order |
| 15 dBm ≤ $P_t < 20$ dBm | Linear + $3^{rd}$ order + $5^{th}$ order | Linear + $3^{rd}$ order + $5^{th}$ order |
| 20 dBm ≤ $P_t ≤ 23$ dBm | Linear + $3^{rd}$ order + $5^{th}$ order + $7^{th}$ order | Linear + $3^{rd}$ order + $5^{th}$ order + $7^{th}$ order |

In Table 2, for example, if the transmit power $P_t$ of the UE is less than 10 dBm, only linear self-interference components need to be considered for SI channel estimation. For example, if the transmit power of the UE is greater than or equal to 10 dBm and is less than 15 dBm, the linear component and higher order components up to the third-order component need to be considered for RS mapping for SI channel estimation and the order of nonlinear self-IC. For the other ranges of UE transmit power, see Table 2 above.

The BS operating in the FDR scheme employs apparatuses exhibiting better performance than those of the UE, and therefore the nonlinear components thereof are different from those of the UE, and the order of nonlinear digital self-IC according to change in transmit power suitable for the BS may be implicitly set as shown in Table 3 below.

TABLE 3

| BS transmit power ($P_t$) | RS mapping for SI channel estimation | Order of nonlinear digital self-IC |
|---|---|---|
| $P_t < 15$ dBm | Linear Only | Linear Only |
| 15 dBm ≤ $P_t < 20$ dBm | Linear + $3^{rd}$ order | Linear + $3^{rd}$ order |
| 20 dBm ≤ $P_t < 25$ dBm | Linear + $3^{rd}$ order + $5^{th}$ order | Linear + $3^{rd}$ order + $5^{th}$ order |
| 25 dBm ≤ $P_t ≤ 30$ dBm | Linear + $3^{rd}$ order + $5^{th}$ order + $7^{th}$ order | Linear + $3^{rd}$ order + $5^{th}$ order + $7^{th}$ order |

In Table 3, for example, if the transmit power $P_t$ of the BS is less than 15 dBm, only linear SI components need to be considered for SI channel estimation. For example, if the transmit power of the BS is greater than or equal to 15 dBm and is less than 20 dBm, the linear component and higher order components up to the third-order component need to be considered for RS mapping for SI channel estimation and the order of nonlinear self-IC. For the other ranges of BS transmit power, see Table 3 above.

Here, RS mapping and signaling necessary for SI channel estimation of the UE and the BS operating in the FDR scheme may be applied in various ways according to the system.

Tables 2 and 3 may vary according to performance of antenna self-IC and analog self-IC. For example, if the performance of antenna self-IC and analog self-IC increases, the maximum order considered when the transmit power increases may be reduced. Conversely, if the performance of antenna self-IC and analog self-IC decreases, the maximum order considered when the transmit power increases may be increased.

Embodiment 2: Pre-Listing Orders of Nonlinear Self-Interference that should be Considered According to Change in Transmit Power of the BS or UE Operating in the FDR Scheme in a Table while RS Mapping for Self-Interference Channel Estimation is Operated Independently of the Orders of Nonlinear Digital Self-IC Dynamic nonlinear digital self-IC according to change in transmit power of the UE and the BS operating in the FDR scheme may achieve the best performance. However, in order to estimate high-order nonlinear components of a self-interference channel, additional RS allocation and corresponding signaling are essential. If RS allocation (e.g., an RS allocation pattern, the number of RS allocations) is changed according to the transmit power and signal transmission for RS mapping information transmission is performed in order to improve FDR performance, system delay will take place. Thereby, nonlinear digital self-IC cannot be performed immediately when the transmit power is changed.

Therefore, in order to address the above-mentioned issue, channel estimation may be performed before the transmit power is changed by pre-setting channel estimation orders necessary for nonlinear digital self-IC in the table. For example, if the transmit power of the UE operating in the FDR scheme is greater than or equal to 15 dBm and is less than 20 dBm, in a system having a maximum power variation value of 2 dBm, the fifth-order component should be estimated and orders up to the fifth order should be considered in nonlinear digital self-IC. However, a margin of 2 dBm may be provided such that, if the transmit power is greater than or equal to 13 dBm and is less than 18 dBm, channel estimation corresponding to the third order may be performed, and then nonlinear digital self-IC may be performed according to change in transmit power or change in performance of self-interference in consideration of the component of corresponding order. Here, the value of the margin may vary among systems. If the value of the margin is set to the maximum value of variation of the transmit power set in each system, change in transmit power may be immediately coped with.

For example, in a system in which the maximum value of power variation has a margin of 2 dBm, the order of nonlinear digital self-IC according to change in transmit power in the UE operating in the FDR scheme may be implicitly set through a table as shown in Table 4 below.

TABLE 4

| UE transmit power ($P_t$) | RS mapping for SI channel estimation | Order of nonlinear digital self-IC |
|---|---|---|
| $P_t < 8$ dBm | Linear Only | Linear Only |
| 8 dBm ≤ $P_t < 13$ dBm | Linear + $3^{rd}$ order | Linear Only or up to $3^{rd}$ order |
| 13 dBm ≤ $P_t < 18$ dBm | Linear + $3^{rd}$ order + $5^{th}$ order | up to $3^{rd}$ order or up to $5^{th}$ order |
| 18 dBm ≤ $P_t ≤ 23$ dBm | Linear + $3^{rd}$ order + $5^{th}$ order + $7^{th}$ order | up to $5^{th}$ order or up to $7^{th}$ order |

For example, in a system in which the maximum value of power variation has a margin of 2 dBm, the BS operating in the FDR scheme employs apparatuses exhibiting better performance than those of the UE, and therefore the nonlinear components thereof are different from those of the UE, and the order of nonlinear digital self-IC according to change in transmit power suitable for the BS may be implicitly set as shown in Table 5 below.

TABLE 5

| BS transmit power ($P_t$) | RS mapping for SI channel estimation | Order of nonlinear digital self-IC |
|---|---|---|
| $P_t < 13$ dBm | Linear Only | Linear Only |
| 13 dBm ≤ $P_t < 18$ dBm | Linear + $3^{rd}$ order | Linear Only or up to $3^{rd}$ order |
| 18 dBm ≤ $P_t < 23$ dBm | Linear + $3^{rd}$ order + $5^{th}$ order | up to $3^{rd}$ order or up to $5^{th}$ order |
| 23 dBm ≤ $P_t ≤ 30$ dBm | Linear + $3^{rd}$ order + $5^{th}$ order + $7^{th}$ order | up to $5^{th}$ order or up to $7^{th}$ order |

Here, RS mapping and signaling necessary for SI channel estimation of the UE and the BS operating in the FDR scheme may be applied in various ways according to the system.

Table 5 may vary according to performance of antenna self-IC and analog self-IC. For example, if the performance of antenna self-IC and analog self-IC increases, the maximum order considered when the transmit power increases may be reduced. Conversely, if the performance of antenna self-IC and analog self-IC decreases, the maximum order considered when the transmit power increases may be increased.

The UE or the BS only need to consider an order to be considered in RS mapping for SI channel estimation corresponding to the transmit power according to Tables 2 to 5 and an order for performing nonlinear digital self-IC corresponding to the transmit power.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method for performing self-interference cancellation by an apparatus which uses the FDR scheme is industrially applicable to various wireless communication systems such as the 3GPP LTE/LTE-A system and the 5G communication system.

The invention claimed is:

1. A method for performing of self-interference cancellation by an apparatus using a full duplex radio (FDR) scheme, the method comprising:
   transmitting a signal at a specific transmit power; and
   performing digital self-interference cancellation based on a maximum order of digital self-interference signal components to be considered for the digital self-interference cancellation corresponding to the specific transmit power of the apparatus,
   wherein, when the specific transmit power is less than a first transmit power value, the maximum order of the digital self-interference signal components is a first order of the digital self-interference signal components,
   wherein the first order corresponds to a linear digital self-interference signal component among the digital self-interference signal components, and
   wherein the digital self-interference cancellation is performed considering up to the first order of the digital self-interference signal components.

2. The method according to claim 1, wherein, when the specific transmit power is greater than or equal to the first transmit power value and less than a second transmit power value, the maximum order of the digital self-interference signal components is a third order of the digital self-interference signal components,
   wherein the third order corresponds to a non-linear digital self-interference signal component among the digital self-interference signal components, and
   wherein the digital self-interference cancellation is performed considering up to the third order of the digital self-interference signal components.

3. The method according to claim 1, wherein, when the specific transmit power is greater than or equal to a second transmit power value and less than a third transmit power value, the maximum order of the digital self-interference signal components is a fifth order of the digital self-interference signal components,
   wherein the fifth order corresponds to a non-linear digital self-interference signal component among the digital self-interference signal components, and
   wherein the digital self-interference cancellation is performed considering up to the fifth order of the digital self-interference signal components.

4. The method according to claim 1, wherein the digital self-interference cancellation is performed considering up to the maximum order of the digital self-interference signal components.

5. The method according to claim 1, wherein the apparatus comprises a user equipment or a base station.

6. An apparatus for performing self-interference cancellation using a full duplex radio (FDR) scheme, the apparatus comprising:
   a transmitter configured to transmit a signal at a specific transmit power; and
   a processor configured to perform digital self-interference cancellation based on a maximum order of digital self-interference signal components to be considered for the digital self-interference cancellation corresponding to the specific transmit power of the apparatus,
   wherein, when the specific transmit power is less than a first transmit power value, the maximum order of the digital self-interference signal components is a first order of the digital self-interference signal components,
   wherein the first order corresponds to a linear digital self-interference signal component among the digital self-interference signal components, and
   wherein the digital self-interference cancellation is performed considering up to the first order of the digital self-interference signal components.

7. The apparatus according to claim 6, wherein, when the specific transmit power is greater than or equal to the first transmit power value and less than a second transmit power value, the maximum order of the digital self-interference signal components is a third order of the digital self-interference signal components, wherein the third order corresponds to a non-linear digital self-interference signal component among the digital self-interference signal components, and wherein the processor is configured to perform the digital self-interference cancellation considering up to the third order of the digital self-interference signal components.

8. The apparatus according to claim 7, wherein, when the specific transmit power is greater than or equal to the second transmit power value and less than a third transmit power value, the maximum order of the digital self-interference signal components is a fifth order of the digital self-interference signal components, wherein the fifth order corresponds to a non-linear digital self-interference signal component among the digital self-interference signal components, and wherein the processor is configured to perform the digital self-interference cancellation considering up to the fifth order of the digital self-interference signal components.

9. The apparatus according to claim 6, wherein the processor is configured to perform the digital self-interference cancellation considering up to the maximum order of the digital self-interference signal components.

10. The apparatus according to claim 6, wherein the apparatus comprises a user equipment or a base station.

* * * * *